March 19, 1946.  O. V. MALMQUIST  2,396,959
POTATO RICER
Filed July 20, 1944
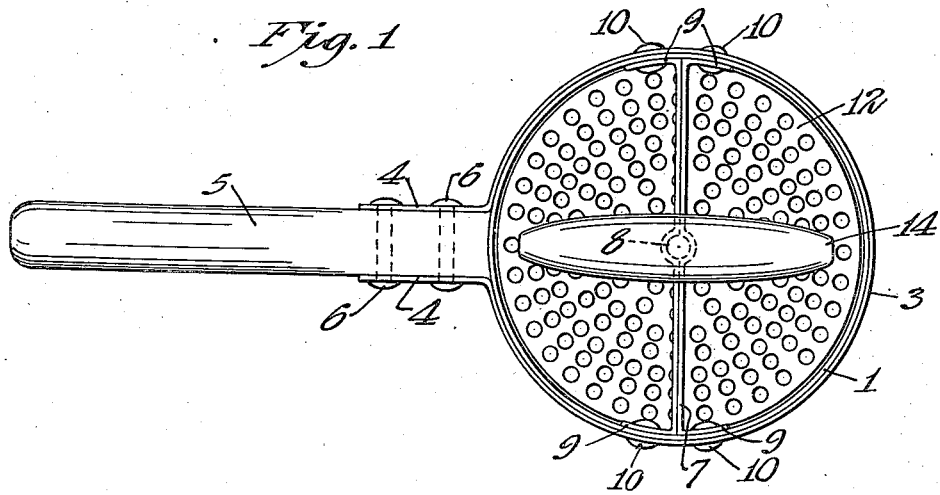
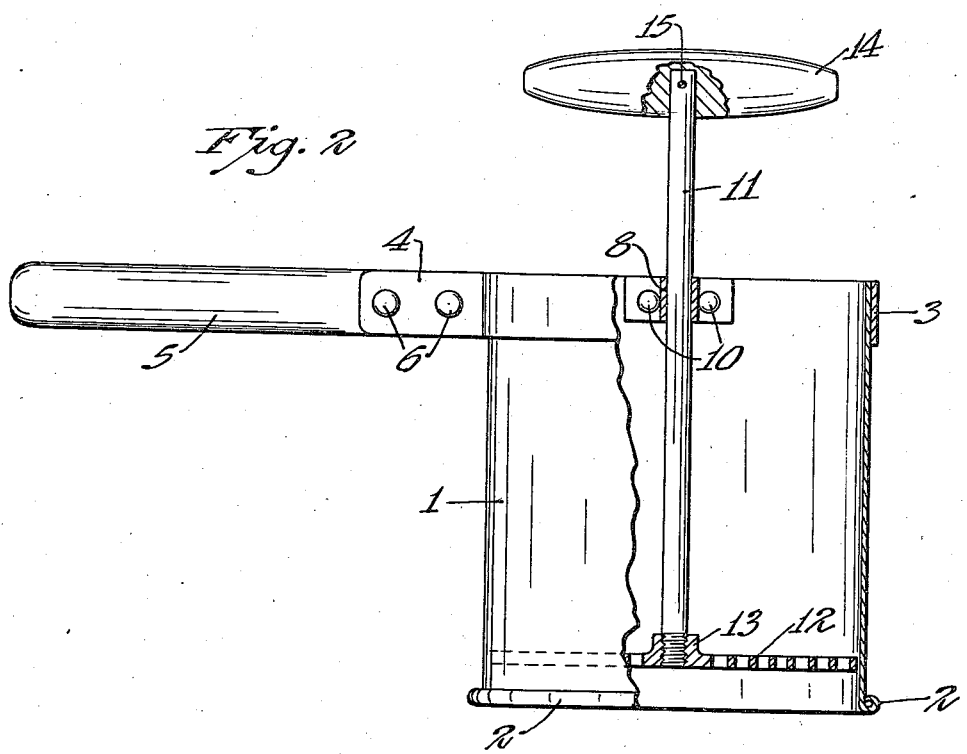
Inventor
Oscar V. Malmquist
By Merchant & Merchant
Attorneys Patented Mar. 19, 1946

2,396,959

UNITED STATES PATENT OFFICE 2,396,959

POTATO RICER

Oscar V. Malmquist, Minneapolis, Minn.

Application July 20, 1944, Serial No. 545,762

2 Claims. (Cl. 146—213)

My invention relates to a device for ricing potatoes, vegetables or other relatively soft material which it may be desirable to work into a partially mashed condition. For brevity, the device is referred to as a potato "ricer" as that is its principal intended use and the material is referred to as "potatoes," but it will be understood that this means of reference does not involve any limitation as to the use of the apparatus or of the scope of the invention.

My invention has for its principal object the provision of a simple inexpensive device for the ricing of potatoes and the like, which is not likely to get out of order and is readily cleaned.

Another object of my invention is the provision of a device which can be used by placing the tubular body portion over the potatoes and then forcing a perforated disc, or the like, over the same with a result that the riced potatoes are in the inside of the container and over the perforate disc at the completion of the operation.

To these and other ends the invention resides in certain improvements in combination of parts, all as will be hereinafter more fully described.

Referring to the drawing in which like characters indicate like parts throughout the several views:

Fig. 1 is a top elevation; and

Fig. 2 is a side view, some parts being shown in elevation and others being broken away and shown in section.

Referring with more particularity to the drawing, numeral 1 indicates a tubular body portion having its bottom edge rolled up in the form of a bead 2 in the conventional manner for purposes of reinforcement. Around the top edge of tubular body 1 is a metal reinforcing strap 3, whose bifurcated ends 4 rigidly embrace a handle 5 by means of rivets 6, or the like.

Extending across the open top end of the tubular container 1 is a strut 7 made up of two flat strips of metal, each being bent into semicircular form at its center to form a circular bearing 8, which is concentric with the axis of tubular body 1. At its outer ends, the metal strips comprising struts 7 are bent outwardly into flanges at 9 and are held, by rivets 10, to the upper open end of housing 1. Mounted in bearing 8 and extending axially through the center of housing 1 is a rod or shaft 11, circular in cross section. Secured to the lower end of shaft 11 is a perforate disc 12, which is only slightly less in diameter than the diameter of the tubular body 1. Preferably, and as shown, the lower end of shaft 11 is removably secured to a boss 13 in the center of perforate disc 12 for the purpose of washing and the like.

Handle 14 is shown as being secured by means of a pin 15, or the like, to a top end of shaft 11. With this novel device it is possible to take the potatoes, or other vegetables to be riced, place them on a flat surface, and place the tubular body portion over them. It follows that in carrying out this step the potatoes or other vegetables will force the perforate disc 12 and shaft 11 to its uppermost position in the body 1. At this point, when pressure is brought to bear upon handle 1, the potatoes or other vegetables under the perforate disc 12 will be forced up through the perforations until the entire amount of potatoes or other vegetables is on top instead of underneath the perforate disc 12. This, of course, is possible because the perforate disc 12 is absolutely flat on its lower surface so as to correspond with the flat surface upon which the potatoes have been placed. By taking ahold of the handle the potatoes thus riced can be transported to a dish or other container such as for table use. Their removal from the container of body 1 is merely a matter of tipping the same on its side and pulling upward or outward on the handle, as the case may be. This operation can be repeated as many times as is necessary until the desired number of potatoes have been riced.

What I claim is:

1. In a potato ricer a vertically disposed imperforate tubular open ended housing, reinforcing means around the peripheral outside surface of said housing at its upper edge, horizontally disposed handle means on said housing connected to said reinforcing means, a diametrical strut secured at its ends to the peripheral inside surface of said housing, said strut being so formed at its central portion as to provide a circular bearing concentric with the axis of said tubular housing, a vertically disposed shaft mounted in said circular bearing for reciprocal movements, a perforate disc-like plunger secured to the bottom of said vertically disposed shaft, and handle means on the upper end of said shaft.

2. In a potato ricer, a vertically disposed tubular open ended housing, a reinforcing strap around the top edge of said tubular housing, said reinforcing strap terminating in bifurcated horizontally projecting ends, a horizontally disposed handle having its inner end secured to the bifurcated ends of the reinforcing strap, a diametrical strut secured at its ends to the peripheral inside surface of said housing, said strut being so formed at its central portion as to provide a circular bearing concentric with the axis of said tubular housing, a vertically disposed shaft mounted in said circular bearing for reciprocal movements, a perforate disc-like plunger secured to the bottom of said vertically disposed shaft, and handle means on the upper end of said shaft.

OSCAR V. MALMQUIST.